United States Patent Office 3,391,760
Patented July 9, 1968

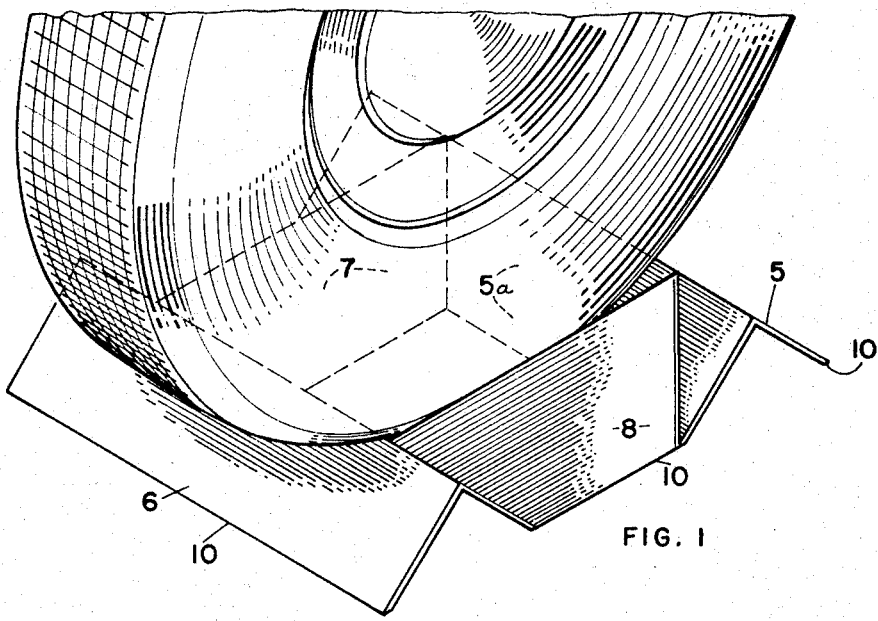
FIG. 1
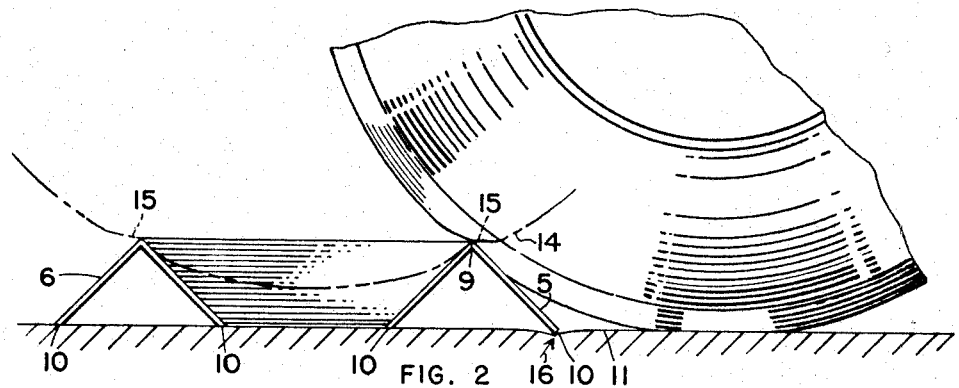
FIG. 2
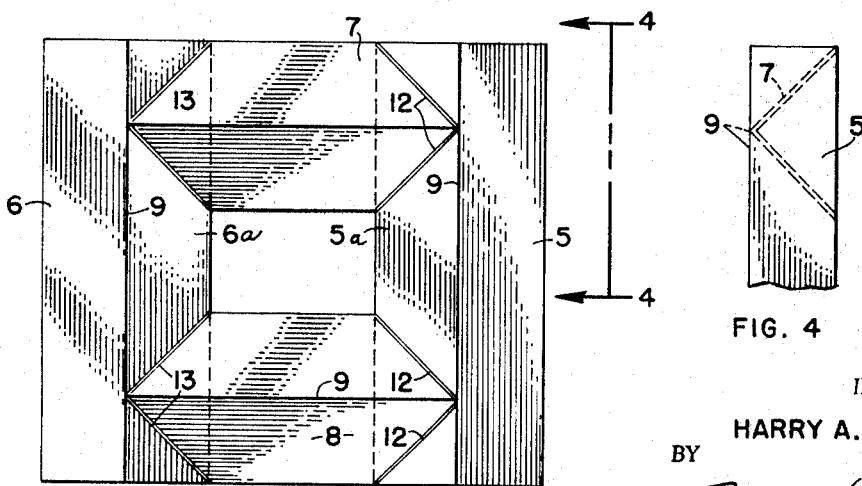
FIG. 3
FIG. 4
INVENTOR.
HARRY A. GONSER
ATTORNEY

3,391,760
WHEEL LOCK BLOCK
Harry A. Gonser, 3593 E. 93rd St.,
Cleveland, Ohio 44105
Filed Aug. 8, 1966, Ser. No. 570,808
1 Claim. (Cl. 188—32)

ABSTRACT OF THE DISCLOSURE

A wheel lock block to be placed on the ground or other surface to receive and support a wheel of a vehicle to prevent accidental displacement of the wheel or the vehicle in any direction particularly while an attendant is inspecting or performing a tire or wheel changing operation on another part of the vehicle.

My invention relates to a device for supporting a wheel of a vehicle to thereby prevent accidental displacement of the vehicle in any direction while the attendant is performing an operation such, for instance, as changing a tire of another wheel on the vehicle and in which such device will lock the wheel against accidental rotation and thus prevent the vehicle from rolling out of contact with the device.

An object of this invention is to produce a relatively light, strong sheet metal wheel lock block of simple construction which is effective to receive and support an automotive vehicle wheel with its tire preferably out of contact with the pavement or roadway to prevent forward or backward movement of the vehicle except when the wheel is power driven.

Another object of the invention is to support the wheel and tire laterally and thereby prevent lateral displacement of the wheel and tire.

Still another object is to prevent accidental withdrawal of the wheel and tire from the device as when the vehicle is resting on a grade.

Still another object of the invention is to provide means by which the device is caused to impinge upon and securely grip the roadway or pavement supporting it under the load of a vehicle and the wheel supported on the device.

A further object of the invention is to provide traction means by which the vehicle tire may be driven to enter into a recess in the device for support therein without tilting the device or otherwise moving it relative to the surface on which it is supported.

Still another object is to construct a device of the above defined character which is so formed that it can be stacked or nested one within another, thereby conserving storage space and enhancing the shipment in quantity.

Other and further objects and advantages of this invention will become more apparent from the following description and claim, reference being made to the accompanying drawing which shows an embodiment of the present invention and the principles thereof, and in which drawing like reference characters are employed to designate like part through out the same.

In the drawings:

FIGURE 1 is a perspective view of a wheel lock block embodying my invention and illustrates the same in use;

FIGURE 2 is a side view of the same illustrating the ability of the device to impinge itself into the supporting surface of a roadway and to provide traction for the tire as a vehicle is driven toward and contacts one end of the device;

FIGURE 3 is a top plan view of the device; and

FIGURE 4 is a fragmentary end view taken on lines 4—4 of FIGURE 3.

In carrying out my invention in accordance with the embodiment illustrated and described herein, the wheel lock block is of generally rectangular form and consists of a pair of opposed end members 5 and 6 at opposed side members 7 and 8, respectively. These end and side members are formed preferably of sheet metal of sufficient thickness and strength to supply a degree of rigidity, when assembled together, to adequately support a vehicle wheel and tire in the manner shown in FIGURE 1 without danger of collapse while at the same time possessing a limited degree of resiliency for carrying out the purposes and objects set forth hereinbefore.

Each of the members 5, 6, 7 and 8 is of transverse angular cross section at substantially 90° as shown and are assembled together with their apexes 9 forming an upper substantially continuous horizontally disposed rectangular ridge, while the respective angularly disposed legs of each section or member open or diverge downwardly from the apex and are adapted to engage and rest along their longitudinal edges 10 upon a support such as a pavement or roadway 11.

The end members 5 and 6 are preferably longer than the side members 7 and 8, as clearly illustrated in FIGURES 1 and 3 and are spaced apart substantially parallel to each other. The side members 7 and 8 have their respective opposite end edges 12 and 13 diverging inwardly and downwardly of their apex so that these end edges will lie flat along the inner inclined legs 5a and 6a of the end members 5 and 6, respectively, and adjacent the ends of the members 5 and 6.

When these four members are assembled in the respective positions shown and described, they may be permanently secured together by welding, brazing or the like, along the edges 12 and 13. It will be noted that a rectangular opening 14 is formed between the assembled members, thus affording additional edges defining the opening, for biting engagement with the support 11 under load.

It will also be noted, as illustrated in FIGURE 2, that the circumference of the tire tread is out of contact with the ground support. The broken line 14 in this figure illustrates clearly how the tire, in climbing the outer leg of the end member 5, is put under compression, as at 15, as it engages and passes across the apex 9 of this member, thus affording traction for the tire and preventing tilting of the device as the tire climbs over the apex. At the same time, the outer bottom longitudinal edge of the member 5 is caused to "dig in" or grip the supporting surface at 16 as shown by the arrow. The broken line in this figure is extended to the opposite end of the wheel lock block to illustrate compression of the tire in climbing across the apex 9 of the member 6 when the vehicle enters from the left hand end of the device.

In FIGURE 1, with the wheel and tire supported in the device as shown, the downwardly converging inner legs of the side members engage the side walls of the tire and with the inner legs 5a and 6a of the end members, provide support for the tire and wheel, both laterally and circumferentially.

It will be understood also, by virtue of the construction shown, that the device is capable of effectively receiving and supporting tires and wheels of a great variety of sizes.

By this invention, the safety factors involved while performing operations on a jacked-up vehicle, such as changing a tire or even where the vehicle is parked on a grade, are materially increased, while the construction of the device is extremely simple, strong and effective in use and permits the nesting or stacking of a number of these devices in an extremely limited space.

The foregoing description and accompanying drawing are considered as illustrative only of the principles of the invention and the wheel lock block of the present invention is not to be regarded as limited by the above described embodiment. Alternative arrangements of parts, substitution of materials and other organization and assembly procedures, apparent to those skilled in the art, may be employed without departing from the scope and spirit of the invention as claimed.

I claim:
1. A wheel lock block for vehicle wheels comprising spaced apert substantially parallel end members, laterally spaced apart side members secured at their respective ends to said respective end members end portions, said members all being of rigid angular form in lateral section and defining a pair of walls diverging downwardly from the apex of the angle thereof and terminating at their bottom edges in a plane for biting and gripping engagement with a supporting surface, the innermost walls of the respective end and side members diverging from their apex portions to provide a substantially continuing support engaging bottom edge of rectangular form, whereby to receive a vehicle wheel segment between and in contact with both end and side member inner walls to support the wheel against accidental lateral and longitudinal displacement while said wheel is disposed within the space defined by said inner walls.

References Cited
UNITED STATES PATENTS

| | | | |
|---|---|---|---|
| 2,441,627 | 5/1948 | Gregg | 188—32 |
| 2,465,551 | 3/1949 | Otterness | 188—32 |
| 2,851,127 | 9/1958 | Smith | 188—32 |
| 2,870,872 | 1/1959 | Rapp | 188—32 |

FOREIGN PATENTS 1,250,144  11/1960  France.

FERGUS S. MIDDLETON, *Primary Examiner.*

MILTON BUCHLER, *Examiner.*

T. W. BUCKMAN, *Assistant Examiner.*